(12) United States Patent
Barber

(10) Patent No.: US 8,517,237 B1
(45) Date of Patent: Aug. 27, 2013

(54) VEHICLE ROOF RACK PADS

(76) Inventor: Thomas Michael Barber, Miami, FL (US)

( * ) Notice: Subject to any disclaimer, the term of this patent is extended or adjusted under 35 U.S.C. 154(b) by 446 days.

(21) Appl. No.: 13/023,127

(22) Filed: Feb. 8, 2011

Related U.S. Application Data

(60) Provisional application No. 61/303,410, filed on Feb. 11, 2010.

(51) Int. Cl.
*B60R 9/05* (2006.01)
*B60R 9/045* (2006.01)

(52) U.S. Cl.
USPC .................. 224/316; 224/319; 224/324

(58) Field of Classification Search
USPC .............. 224/319, 324, 318, 309, 316, 917.5
See application file for complete search history.

(56) References Cited

U.S. PATENT DOCUMENTS

| | | | | |
|---|---|---|---|---|
| 4,326,655 A | * | 4/1982 | Gradek et al. | 224/324 |
| 4,354,625 A | | 10/1982 | Peoples | |
| 4,681,247 A | * | 7/1987 | Prosen | 224/322 |
| 4,743,057 A | * | 5/1988 | Loren | 296/180.1 |
| 4,957,400 A | * | 9/1990 | Karp | 410/110 |
| 5,067,644 A | * | 11/1991 | Coleman | 224/324 |
| 5,607,093 A | | 3/1997 | Geier | |
| 5,769,291 A | | 6/1998 | Chasan | |
| 5,845,827 A | * | 12/1998 | Reising | 224/316 |
| 5,947,354 A | * | 9/1999 | Williams | 224/318 |
| 5,951,231 A | * | 9/1999 | Allen | 414/462 |
| 6,257,261 B1 | * | 7/2001 | Johnson | 135/96 |
| 6,685,070 B2 | * | 2/2004 | Szigeti | 224/321 |
| 7,152,769 B2 | * | 12/2006 | Johnston et al. | 224/324 |
| 7,654,423 B1 | * | 2/2010 | Christiansen | 224/321 |
| 2005/0199665 A1 | * | 9/2005 | Plzak | 224/318 |
| 2007/0181622 A1 | * | 8/2007 | Rocchio | 224/324 |
| 2010/0127026 A1 | * | 5/2010 | Rhodes | 224/318 |
| 2011/0068137 A1 | * | 3/2011 | Murray et al. | 224/318 |
| 2011/0297713 A1 | * | 12/2011 | Gisin | 224/327 |

FOREIGN PATENT DOCUMENTS

GB 2118117 A * 10/1983

* cited by examiner

*Primary Examiner* — Justin Larson
(74) *Attorney, Agent, or Firm* — Christine Q. McLeod; Beusse, Wolter, Sanks, Mora & Maire

(57) ABSTRACT

An improved apparatus and system for vehicle roof rack pads that provide improved support, aerodynamics, and cushioning. The pad includes an aerodynamically shaped elongated tubular member, wherein a cross-section of the pad has an airfoil exterior shape with a leading edge and a trailing edge and has a lengthwise interior hole therein for receiving a crossbar and one or more slots along the trailing edge for receiving tie down straps, where the slots are placed at a radial depth so as to prevent deformation of the trailing edge and the exterior airfoil shape.

20 Claims, 2 Drawing Sheets

VEHICLE ROOF RACK PADS

CROSS-REFERENCE TO RELATED APPLICATIONS

This application claims priority from U.S. provisional application Ser. No. 61/303,410, filed Feb. 11, 2010, the disclosure of which is incorporated herein by reference in its entirety.

BACKGROUND OF THE INVENTION

1. Field of the Invention

This invention relates to vehicle roof rack pads, and specifically to an improved apparatus and system for vehicle roof rack pads that provide improved support, aerodynamics, and cushioning.

2. Discussion of the Background

Vehicle roof racks have been used for a number of years to increase the load carrying capability. Generally, these racks include a framework permanently or removeably attached to the roof having one or more crossbars for carrying objects such as sporting equipment (surfboards, skis, hang gliders), work equipment (ladders, poles, pipes), luggage, boxes, and the like.

In order to cushion the objects carried on the crossbars, mounting pads may be attached to the crossbars. Such pads generally comprise foam wrapped around the crossbars and secured with tape or the like, or cylindrical foam tubing having an elongated hole for receiving the crossbars, usually also further secured with tape or the like. Often closed-cell foam tubes that are designed as floating pool toys are used as padding for the crossbars.

Retaining means for securing the objects to the rack include rope, string, straps, or tension adjustable hook devices.

A number of patents exist that describe roof carriers and racks, such as U.S. Pat. Nos. 4,354,625; 5,067,644; 5,607,093; 5,769,291; 7,152,769 all incorporated herein by reference.

SUMMARY OF THE INVENTION

An embodiment of the invention comprises a pad for a crossbar of a vehicle roof rack, the pad comprising an aerodynamically shaped elongated tubular member, wherein a cross-section of the pad comprises an airfoil exterior shape having a leading edge and a trailing edge and has a lengthwise interior hole therein for receiving the crossbar and one or more slots along the trailing edge for receiving tie down straps wherein the slots are placed at a radial depth so as to prevent deformation of the trailing edge airfoil shape. The pad further comprises compressible material to provide cushioning. The pad further comprises an exterior skin for increased smoothness, aerodynamics, durability, and decreased water absorption.

Another embodiment of the invention comprises a crossbar and/or vehicle roof rack system comprising the pad described herein.

It is an object of the present invention to provide an improved apparatus and system for vehicle roof rack pads that provide improved support, aerodynamics, and cushioning.

A further object is to provide a pad that is quieter and has lower drag.

A still further object is to provide a pad that is durable and UV resistant.

Further objects and advantages of our invention will become apparent from a consideration of the drawings and the technical description.

All patents, patent applications, provisional applications, and publications referred to or cited herein, or from which a claim for benefit of priority has been made, are incorporated herein by reference in their entirety to the extent they are not inconsistent with the explicit teachings of this specification.

BRIEF DESCRIPTION OF THE DRAWINGS

A more complete appreciation of the invention and many of the attendant advantages thereof will be readily obtained as the same become better understood by reference to the following detailed description when considered in light of the following drawings, wherein.

Figure 1:
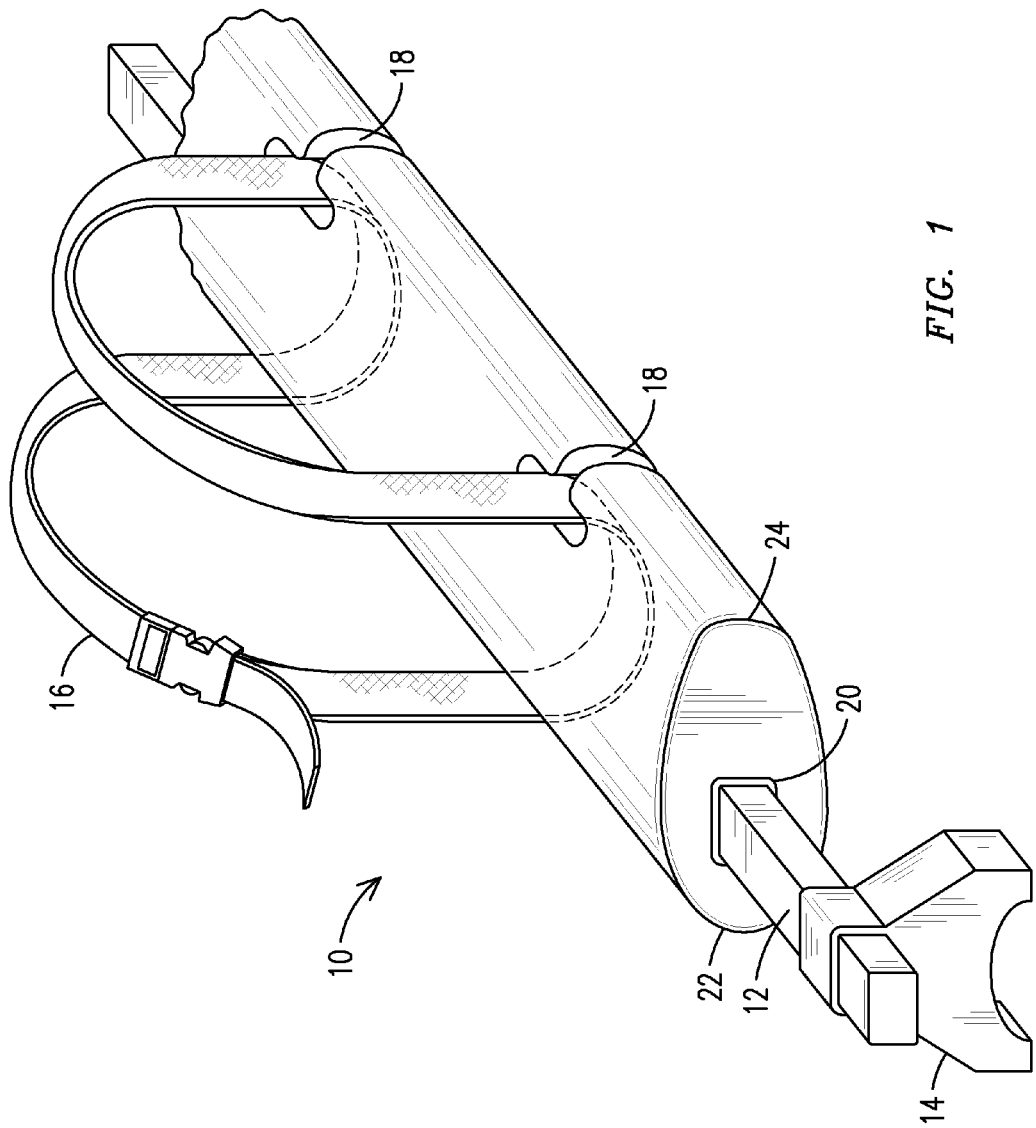
FIG. 1 shows a perspective view of the roof rack pad in an embodiment of the present invention mounted on a crossbar of a roof rack and having tie down straps thereon to secure an object thereto.

While the present invention will be described with reference to the details of the embodiments of the invention shown in the drawing, these details are not intended to limit the scope of the invention.

DETAILED DESCRIPTION OF THE PREFERRED EMBODIMENTS

Referring now to the drawings, wherein like reference numeral designate identical or corresponding parts throughout the several views, embodiments of the invention are shown.

Figure 2:
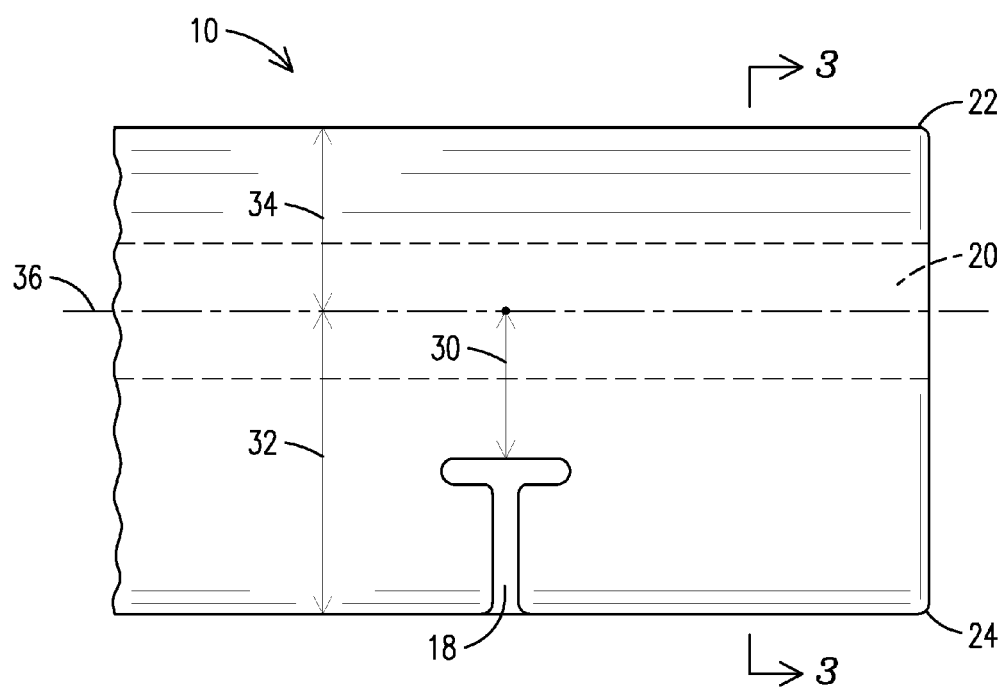
FIG. 2 shows a top plan view with an object fastening slot for receiving a tie down strap in an embodiment.
Figure 3:
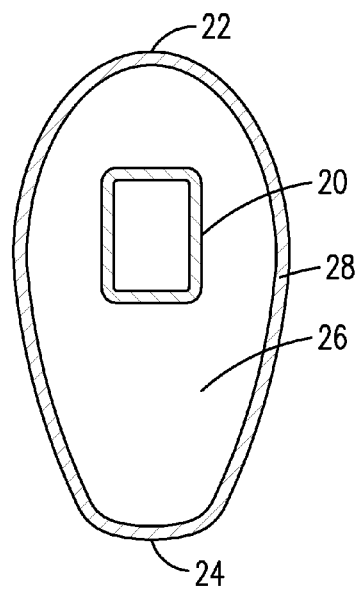
FIG. 3 shows a cross section of the pad in an embodiment.

The present invention relates to an improved aerodynamic elongated pad 10 for a roof rack crossbar. As illustrated in FIG. 1, a perspective view of the roof rack pad 10 in an embodiment of the present invention mounted on a crossbar 12 of a roof rack 14 and having tie down straps 16 thereon to secure an object (not shown) thereto is shown. One or more object fastening slots 18 are provided for receiving the tie down strap 16. An elongated hole 20 is provided through the length of the pad for receiving the crossbar 12. FIG. 2 is a top plan view showing the object fastening slot 18 for receiving a tie down strap 16 and the elongated crossbar-receiving hole 20. FIG. 3 shows a cross section of the pad 10 having an aerodynamic exterior shape having a leading edge 22, a trailing edge 24. The pad is comprised of a cushioning material 26. It may also comprise an exterior skin 28. The elongated crossbar-receiving hole 20 may be shaped to snuggly fit a variety of crossbar shapes.

The improved aerodynamic pad 10 shaft preferably comprises an elongated tube shape that has an exterior with a non-circular cross section having aerodynamic shape. In an embodiment the pad 10 comprises an elongated tube shape having an airfoil exterior cross section in a preferred embodiment, oriented with a leading edge 22 that is on the half of the pad 10 aligned with the direction of vehicle travel and a trailing edge 24 opposite thereto. In another embodiment a substantially airfoil-like elliptical or teardrop shape (or other suitable cross sectional shape) is used, wherein the elongated hole 20 is positioned radially closer to one part of the major axis making it the leading edge 22 and the object fastening slots 18 are located opposite on the trailing edge 24. The aerodynamic shape of the pad 10 reduces drag and noise of the crossbars 12 by reducing turbulence. In one embodiment, the pad 10 has a height of approximately 2.375-2.50 inches, a width from leading to trailing edge of approximately 4.90-5.0 inches, and a variety of lengths to fit partly or substantially all the length of the crossbar. The length may be cut to size.

Optionally, an aerodynamic "trip strip" (not shown) lengthwise along the leading edge 22 may be provided. The trip strip comprises a slightly raised ridge to provide for less drag and noise reduction as known in the art.

The elongated crossbar-receiving hole 20 disposed lengthwise through the pad 10 allows for mounting onto the crossbar 12. The size and shape of the lengthwise hole 20 may be geometrically matched to a variety of crossbars for a snug fit and to prevent rotation about the crossbar 12. Or one or more non-specific size/shapes may be provided (e.g., small, medium, large, square, rectangular, circular, etc.).

One or more object fastening slots 18 are provided for receiving a tie down straps 16. Straps 16 may be any of a known variety of strap, ropes, or the like. The slots 18 are located on the trailing edge 24 in any of a number of spaced relations as a matter of design choice to allow for receiving straps 16 to secure objects thereto. The slots 18 are placed at a radial depth 30 (with respect to the central axis 36 of the elongated hole 20) so as to prevent deformation/distortion of the trailing edge 24 airfoil shape. The radial depth 30 is preferably less than the trailing edge radius 32 and somewhat approaches the leading edge radius 34. Preferably, the slots 18 are preferably of a T-shape so the straps 16 may be inserted through the lower portion of the "T" and secured in place at the top portion of the "T". Other slot shapes which provide the same functionality are contemplated herein. For example, a slit comprising just the top portion of the T-shape may be utilized where the strap 16 would then be threaded through. In still a further embodiment, the straps 16 may be permanently affixed to the pad 10 at a location that is at a radial depth 30 so as to prevent deformation/distortion of the trailing edge 24.

Preferably, the pad 10 also comprises (or is coated with) a material 26 that has a low coefficient of drag so that it will have a reduced tendency to be affected by air drag. The pad 10 is preferably compressible (and/or deformable) to provide cushioning in all directions, or at least cushioning along a top surface which receives the object thereon. In a preferred embodiment, the pad 10 is made of a cellular material 26 such as flexible polyurethane foam, or more specifically a urethane/polyurethane self-skinning material having a range of densities, resilience and colors. Features include light weight, open or closed cell, and abrasion resistance. The cushioning material 26 is characterized in that the polyurethane foam has a self-skin layer 28 formed thereon (preferably on the exterior of the pad 10 and in certain embodiments along the walls of the elongated hole 20). With the formation of the self-skin layer 28, smoothness increases, water absorption ratio decreases, drag decreases, and adhesion performance is improved. Polyurethane foams can be produced with a wide range of rigidity (from very soft to rigid) and a wide range of density, open-cell (and hence porous) or closed cell. In further embodiments, a cloth or vinyl covering may be used as the skin layer 28 or in addition to the skin layer. Manufacturing of the pad 10 may include a variety of firmness and skin thickness depending on the application.

Color may be added into the base cushioning material 26 or applied as a coating to the inside of the mold. Alphitic resin coatings or the like may be used to coat the inside of the mold. The two processes may be used in conjunction with each other or individually. Color additives and color coatings provide UV protection as well as color to the pad.

Inserts of various materials (such as metal or plastic) and shapes may be placed inside of the pad 10 during manufacturing or integrated into the exterior of the pad. These inserts can provide reinforcement of the pad 10 to help maintain its shape as well as carry a greater load. Moreover, inserts may be used to provide firm/rigid attachment points for mounting the pad to the crossbar or for attachment points for accessories, straps, or rope. For example, the object fastening slots 18 may be constructed of a more ridged material than the foam for durability, either under the self-skin layer or on the exterior surface. Attachment points, like buckles, female threads, recessed links, etc. can also be provided. Moreover, reinforcements can be placed at the point of permanently affixed attachment straps 16.

Obviously, numerous modifications and variations of the present invention are possible in light of the above teachings. It is therefore to be understood that within the scope of the appended claims, the invention may be practiced otherwise as specifically described herein.

The invention claimed is:

1. A padding system for a crossbar of a vehicle roof rack, the system comprising:
a pad comprising an aerodynamically shaped elongated tubular member, wherein a cross-section of the pad comprises an airfoil exterior shape having a leading edge and a trailing edge and having a lengthwise interior hole therein for receiving a crossbar and one or more slots along the trailing edge for receiving tie down straps, wherein the slots are placed at a radial depth so as to prevent deformation of the trailing edge and the exterior airfoil shape.

2. The padding system of claim 1 wherein the pad further comprises compressible material to provide cushioning.

3. The padding system of claim 1 wherein the pad further comprises an exterior skin for increased smoothness, aerodynamics, durability, and decreased water absorption.

4. The padding system of claim 1 further comprising one or more tie down straps adapted to secure an object thereto.

5. The padding system of claim 1 further comprising a vehicle roof rack.

6. The padding system of claim 1 comprising a plurality of pads.

7. The padding system of claim 1 wherein the pad is adapted to be oriented with the leading edge aligned with the direction of vehicle travel and the trailing edge opposite thereto.

8. The padding system of claim 1 wherein the lengthwise interior hole is positioned radially closer to the leading edge and the slots are located opposite on the trailing edge.

9. The padding system of claim 1 wherein the airfoil exterior shape is substantially elliptical or teardrop.

10. The padding system of claim 1 further comprising an aerodynamic trip strip positioned lengthwise along the leading edge comprising a slightly raised ridge to provide for less drag and noise reduction.

11. The padding system of claim 1 wherein the lengthwise interior hole is geometrically shaped for a snug fit about a vehicle cross bar to prevent rotation about the crossbar.

12. The padding system of claim 1 wherein the slots are of a substantially T-shape for receiving the tie down straps inserted through a lower portion of the "T" and secured in place at a top portion of the "T".

13. The padding system of claim 1 wherein the tie down straps are affixed to the pad at a location that is at a radial depth so as to prevent deformation and distortion of the trailing edge.

14. The padding system of claim 1 further comprising one or more additional inserts integrated into the pad to provide reinforcement of the pad to help maintain its shape.

15. The padding system of claim 1 further comprising one or more additional inserts comprising attachment points for mounting the pad to the crossbar or for attachment points for accessories, straps, or rope.

16. A vehicle roof rack system, the system comprising:
one or more crossbars for securing to a vehicle roof;
one or more pads, wherein each pad comprises an aerodynamically shaped elongated tubular member, wherein a cross-section of the pad comprises an airfoil exterior shape having a leading edge and a trailing edge and having a lengthwise interior hole therein for receiving the crossbar and one or more slots along the trailing edge for receiving tie down straps, wherein the slots are placed at a radial depth so as to prevent deformation of the trailing edge and the exterior airfoil shape.

17. The vehicle roof rack system of claim 16 further comprising one or more tie down straps adapted to secure an object thereto.

18. The vehicle roof rack system of claim 16 wherein the slots are of a substantially T-shape for receiving the tie down straps inserted through a lower portion of the "T" and secured in place at a top portion of the "T".

19. The vehicle roof rack system of claim 16 wherein the lengthwise interior hole is positioned radially closer to the leading edge and the slots are located opposite on the trailing edge.

20. The vehicle roof rack system of claim 16 wherein the airfoil exterior shape is substantially elliptical or teardrop.

* * * * *